United States Patent [19]
Everett, Jr.

[11] 4,149,776
[45] Apr. 17, 1979

[54] PORTABLE MICROFICHE READING INSTRUMENT

[75] Inventor: Seth L. Everett, Jr., Monmouth County, N.J.

[73] Assignee: The United States of America as represented by the Secretary of the Army, Washington, D.C.

[21] Appl. No.: 898,738

[22] Filed: Apr. 24, 1978

[51] Int. Cl.² .................... G02B 27/02; G09F 11/30
[52] U.S. Cl. .................................. 350/241; 40/364; 350/90
[58] Field of Search .................. 350/80, 90, 238, 241, 350/255; 40/362–367

[56] References Cited
U.S. PATENT DOCUMENTS

| | | | |
|---|---|---|---|
| 2,674,152 | 4/1954 | Wilkinson | 350/134 |
| 3,710,488 | 1/1973 | Baxter | 40/364 |
| 3,887,270 | 6/1975 | Lazarus et al. | 350/241 |

FOREIGN PATENT DOCUMENTS 315643 10/1956 Switzerland ................. 350/80

Primary Examiner—John K. Corbin
Assistant Examiner—Wm. H. Punter
Attorney, Agent, or Firm—Nathan Edelberg; Jeremiah G. Murray; Daniel Sharp

[57] ABSTRACT

A relatively compact, inexpensive and portable viewer for reading photographic reductions, such as microfiche film cards, includes a cylindrical translucent diffuser tube which provides for entry of sufficient light under usual ambient conditions for viewing the film; a transparent cylindrical mounting tube axially centered within the diffuser tube; and a slide tube axially and longitudinally movable, by hand operation, within the transparent mounting tube. The slide tube forms an optical path comprising a rectangular opening in its wall near one of its ends which acts as a film gate, a reflecting mirror positioned in line with the wall opening, a magnification lens and an eyepiece lens. The film is inserted in the cylindrical gap formed between the diffuser tube and the mounting tube and the slide tube is moved so that the desired portion of the film may be viewed, enlarged and read.

8 Claims, 3 Drawing Figures

PORTABLE MICROFICHE READING INSTRUMENT

The invention described herein may be manufactured and used by or for the Government for governmental purposes without the payment of any royalties thereon or therefor.

BACKGROUND OF THE INVENTION

At the present time microfiche cards, as a means of conveniently storing information, are becoming increasingly popular. A microfiche card is a photographic film having images in a reduced size so that the image may be magnified and viewed. For example, one size of microfiche card may be six inches long and consist of six rows of rectangular image frame areas with each row having 15 frames. Each of the 90 image frames represent a 8½ ×11-inch page reduced to 1/24 of its original size. In order to view an image frame, one magnifies the image 24 times, with proper lighting, and views the selected image representing one page of a document.

PRIOR ART STATEMENT

There are a number of different types of microfiche readers commercially available. For example, one type of reader includes a high-power lamp and an optical system which produces the image on a rear projection screen. Such projectors are well adapted for use in fixed locations such as offices, but are too large, heavy and expensive for use under field conditions. Often such projection types of microfiche readers, because of their size and expense, may only be available in one location in an office or laboratory and there may be only one, or a few, of them to accommodate many users. Consequently, individuals are discouraged from using microfiche cards by the necessity of going to the projector and possibly having to wait to use the machine.

It would be useful to have a viewer instrument for microfiche cards which could be used to read the cards indoors or outdoors, could be easily carried, which would be inexpensive, and which would occupy little space. For example, the maintenance information relating to military vehicles could be placed on a series of microfiche cards so that the mechanic in the field could select the card relating to the particular portion of the vehicle to be repaired. He would place the selected microfiche card in the viewer instrument and read the document relating to the repair. Such compact means of information storage is obviously preferable to the transportation of numerous books or looseleaf sheets which would be equivalent to the microfiche cards.

There have been suggested from time to time portable viewers for other types of photographic images. For example, a simple battery operated viewer may be used to view a 35 mm photographic slide film of the type used for slide film projection. However, the image is generally magnified only 2-4 times and such viewers are not suitable for the enlargement required for microfiche cards. It is known to project the images from motion picture film or slide film using a rear film projector in which the image is projected on the rear side of a translucent screen. Such image projection is suitable when the projected image is to be magnified from two or six times under ambient lighting conditions and may be used to project in darkness with greater magnification. However, this type of projection system may not be used for microfiche cards under daylight ambient lighting conditions without using a high-powered light source. It has been estimated that to project a microfiche card on a rear projection screen under 24 power magnification, with the informaton on the card readable under daylight lighting conditions, would require about 400 lumens of lighting power. Such power generally would be available only from a high-power incandescent or arc lamp and would require a large battery if it is to be portable and, in addition, may require a complex and expensive circuitry for the lamp.

FEATURES AND OBJECTIVES OF THE INVENTION

It is consequently an objective of the present invention to provide a viewer instrument for viewing images on film, such as microfiche film cards and other types of photographic data storage, which viewer instrument is readily portable and does not require an external or an internal source of power.

It is a further objective of the present invention to provide such a viewer instrument which is relatively inexpensive to produce so that it may be widely distributed and used by personnel under field conditions.

It is a further objective of the present invention to provide such a viewer instrument which will provide a sufficient degree of magnification, for example, 24 power, so that personnel utilizing the instrument may read the written information contained in the form of reduced-size images on photographic media.

It is a further objective of the present invention to provide such a viewer device which is relatively rugged so that it may be used under field conditions and which is not easily subject to loss of alignment due to mishandling or vibration.

It is a further objective of the present invention to provide such a viewer instrument which uses ambient light falling on the instrument to provide a bright, evenly illuminated and clear image.

It is a further objective of the present invention to provide such a viewer instrument which is sufficiently low in cost and small in size so that it may be used by individuals at their desks with each person in the organization having such a viewer instrument for his own use.

It is a further objective of the present invention to provide such a viewer instrument which has only one moving part so that it generally will not require maintenance, repair or periodic parts replacement.

It is a further objective of the present invention to provide such a viewer instrument which does not require any focusing adjustment by the user, so that the lenses may be fixed in position.

It is a feature of the present invention to provide a portable viewer instrument for viewing photographic matter on film, such as microfiche film cards. The viewer includes a cylindrical translucent diffuser tube which provides for entry of sufficient light, under daylight conditions or under artificial room lighting, for viewing the film. A battery or other source of power is required. A transparent cylindrical mounting tube is centered within the diffuser tube. A cylindrical gap is formed between the diffuser tube and the mounting tube and the film is inserted into that gap. The viewer further comprises a hollow slide tube which is centered in the mounting tube. The slide tube is longitudinally and axially movable by hand within the mounting tube to align an opening in the slide tube wall with the image on the film which is to be viewed. A fixed length optical path within the slide tube is formed by a window in the slide tube wall which acts as a film gate, a reflecting mirror fixed within the slide tube at an angle to its axis and in image reflecting position relative to its wall window, and magnification (objective) and eyepiece lenses centered within the slide tube. As the optical path length and the interrelationships of the optical elements remain constant regardless of how the slide tube is moved, the focus of the device can be fixed at the time of manufacture with no need for any subsequent adjustment by the user. The slide tube may be moved by hand so that the selected portion of the film is illuminated by light through the diffuser tube. The image from that selected film portion is seen through the wall opening and is enlarged and viewed using the two lenses.

BRIEF DESCRIPTION OF THE DRAWINGS

Other objectives of the present invention will be apparent from the following detailed description which provides the inventor's presently known best mode of practicing the invention, which detailed description should be taken in conjunction with the accompanying drawings.

In the drawings.

DETAILED DESCRIPTION OF THE INVENTION

Figure 1:
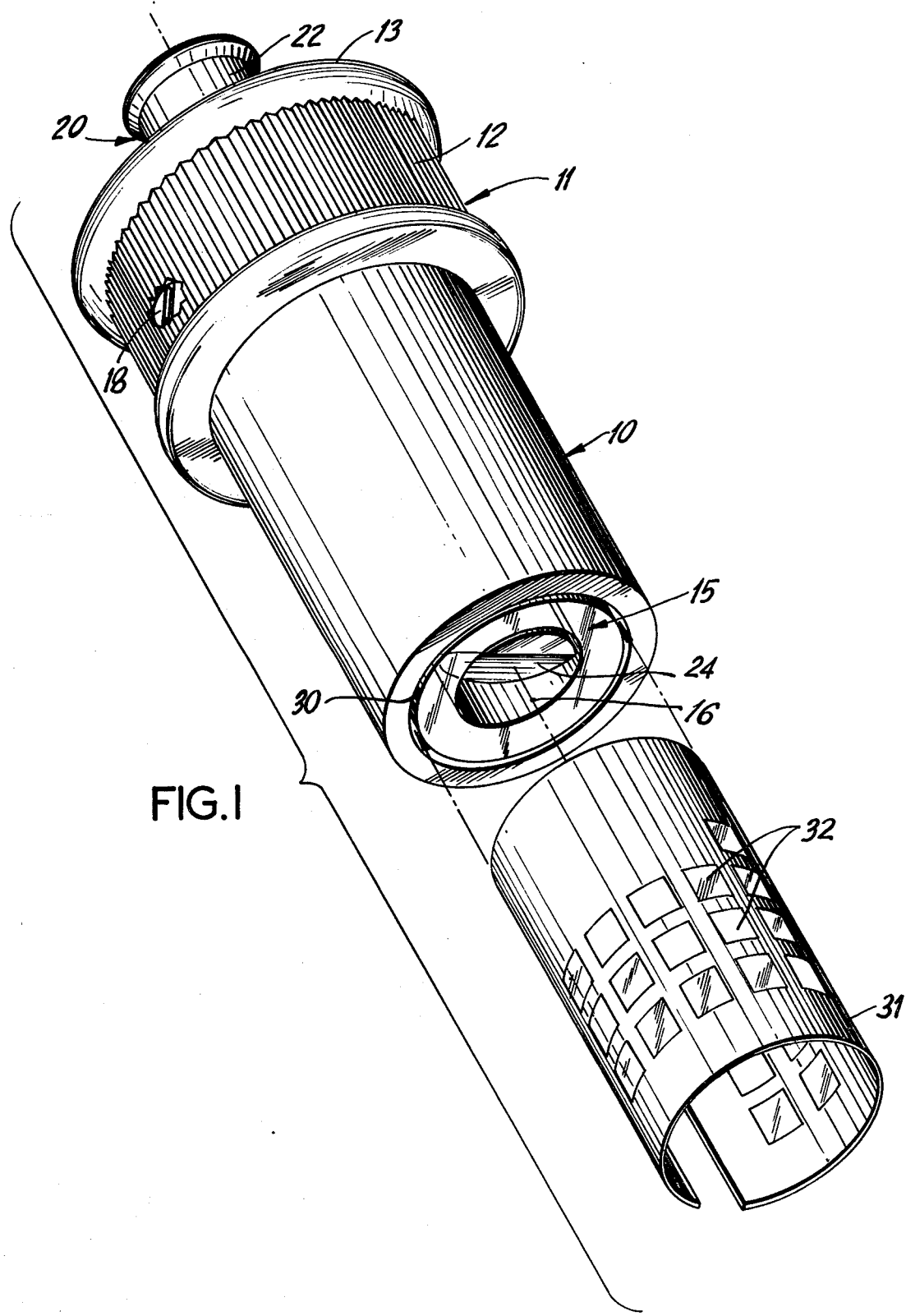
FIG. 1 is a perspective view of the viewer instrument of the present invention showing a microfiche film card which has been partially rolled for insertion into the viewing device.
Figure 2:
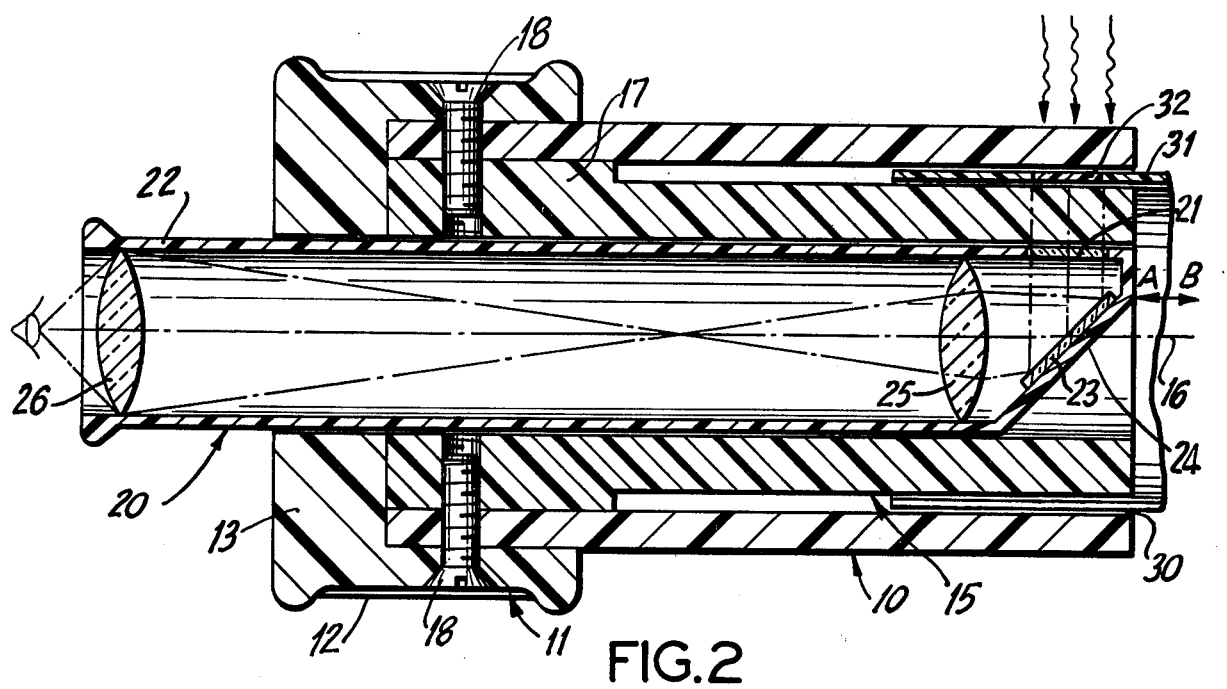
FIG. 2 is a side cross-sectional view of the viewer instrument of the present invention showing the optical path of the image.

As shown in FIGS. 1 and 2, the viewer instrument of the present invention is a relatively small hand-held instrument which may be easily transported. The instrument includes a cylindrical tubular diffuser tube 10 which is translucent and preferably is of a translucent plastic resin. The diffuser tube 10, at one of its ends, is inserted in a ring-like grip member 11. The grip member 11 is opaque and preferably is of a plastic resin. The grip member 11 has an outer circumferential portion 12, preferably having serrations, and an inwardly directed circumferential flange portion 13 forming a circular opening.

A transparent cylindrical tube 15 is positioned within the translucent tube 10. The transparent tube 15 is preferably of a clear plastic resin and is a right cylinder having a central axis which coincides with the common axis 16 of the viewer instrument. An enlarged circumferential portion 17 at the rear end of the transparent tube 14 is used to attach the transparent tube 15 to the translucent tube 10. For example, the attachment may be by means of machine screws 18 which protrude through the grip member 13 and permit the three members, i.e., the grip member 13, the translucent tube 10 and the transparent tube 15, to be assembled and subsequently disassembled for cleaning or repair. Alternatively, and not shown, the three members may be fixed together by adhesives.

A slide tube assembly 20 is positioned and centered within the transparent tube 15. The slide tube assembly is centered within the hole formed by the flange portion 13 of the grip member 11 and is arranged so that the slide tube assembly 20 may be axially rotated about its central axis, which axis coincides with the central axis 16 of the viewer instrument. In addition, the slide tube assembly 20 may be slid longitudinally, by the hand of the user, forward and back along the axis 16 in the directions shown by the arrows A and B, respectively, of FIG. 2.

The slide tube assembly 20 includes an opaque slide tube 22, preferably of opaque plastic, and has a rectangular window 21 formed in the wall of the tube 22. The window 21 preferably is a rectangular clear glass or clear plastic window or an opening. The window 21 is substantially the same size and shape as the image area to be viewed on the film. For example, the window 21 is a rectangular area the same size as a frame on a microfiche card, which is the reduced scale image of a document page.

A mirror 23 is fixed to the interior of a slanted end wall 24 of the slide tube 22. Preferably the mirror is a glass rectangular front face mirror which is positioned so that its plane is at an angle of 45 degrees to the central axis 16. A magnifying lens (objective lens) 25 is positioned and centered within the tube 22 and is preferably a convex-convex magnifying lens which may be either glass or a clear plastic resin. An eyepiece lens 26 is positioned and centered within the tube 22 near the end of the tube and is also a convex-convex lens of clear glass or of clear plastic resin.

A cylindrical gap 30 is formed between the translucent tube 10 and the transparent tube 15. That gap is of a sufficient width so that it readily accepts the film or the microfiche card 31 which is to be viewed. For example, the circumferential length of the gap may be 6.28 inches, permitting the use of a standard 6-inch-long microfiche card. That length of gap requires a 2-inch diameter at its inner edge. The microfiche card 31 has a number of small rectangular image frame areas 32 each of which normally corresponds to the reduced image of an 8½×11 inch document page.

In operation, the user partially rolls the microfiche card 31 or other film which is to be viewed in the viewer device. He inserts the partially rolled microfiche 31 within the cylindrical gap 30. As shown in FIG. 2, the ambient light, for example, the daylight outside or the daylight in a room or the artificial lighting within a room, enters through the translucent tube 10. The translucent tube 10 permits entry of sufficient light for viewing and yet prevents degradation of the image due to the ambient conditions.

The light passes through a microfiche film frame 32, frame 32 having been selected by the user through rotation and longitudinal movement of the slide tube assembly 20. The illuminated image frame 32 of the microfiche is reflected by the mirror 23, magnified by the objective lens 25 and viewed by the viewer through the eyepiece lens 26.

Figure 3:
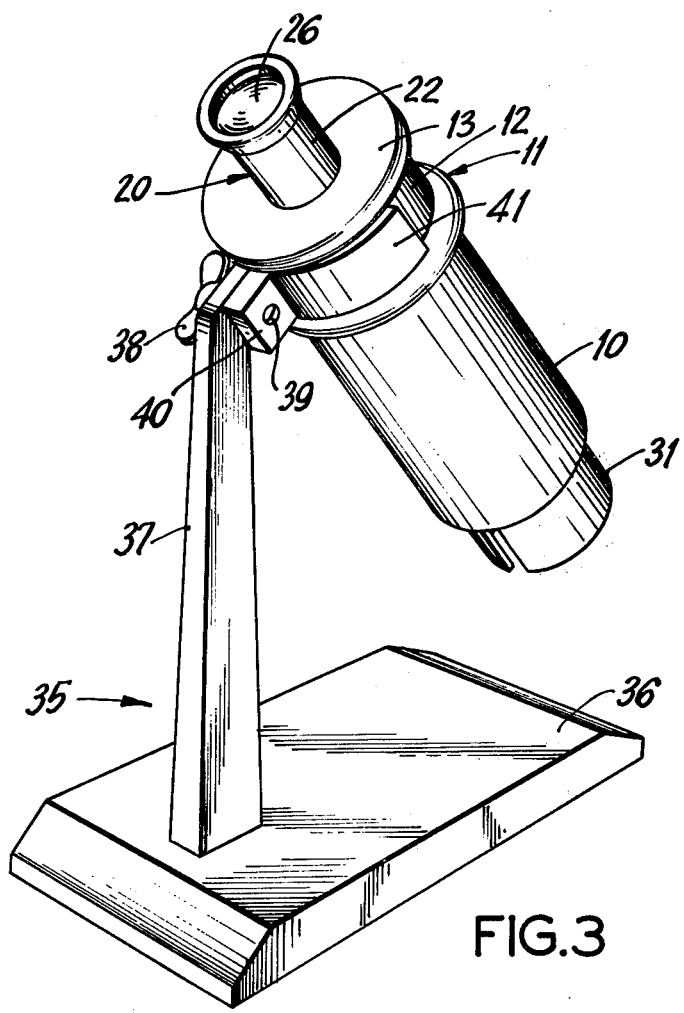
FIG. 3 is a perspective view showing the viewer instrument of the present invention mounted in a desk stand.

As seen in FIG. 3, the viewer device of the present invention may be held without using hands, by means of the microfiche viewer instrument desk stand 35. The microfiche reader desk stand 35 has a horizontal base 36 which is adapted to sit on the top of a desk and which supports a vertical stand portion 37. At the top of the vertical stand portion there is located a wing nut 38 which is screwed onto a screw 39. The screw 39 protrudes through the vertical portion 37 and through the clamping block 40. The clamping block 40 retains a "C" shaped resilient band 41, preferably of spring steel, which may be secured to the grip portion 12 by opening its open jaw.

The user inserts the microfiche or other film into the gap 30 (not shown in FIG. 3). The natural resilience of the microfiche or other film will make it tend to open to the flat position and causes it to stay in place within the gap 30. The slide tube member 20 may then be adjusted axially and longitudinally so that its window 21 is located at the selected frame of the film. The film may then be viewed without the need of the user to keep his hand on the viewer device.

Modifications may be made in the present invention within the scope of the subjoined claims. For example, certain of the parts have been illustrated as being of plastic resin. However, alternatively they may be made of other material; for example, the slide tube 22 may be of metal and the transparent tube 15 and the translucent tube 10 may be of glass.

What is claimed is:

1. A portable viewing device for viewing photographic matter on film, such as microfiche film cards, including
    a cylindrical translucent diffuser tube which provides for entry of sufficient light under daylight ambient conditions for viewing the film;
    a transparent cylindrical mounting tube centered within said diffuser tube to provide a cylindrical gap between said diffuser tube and said mounting tube for the insertion of said film; and
    a hollow slide tube having a central axis and centered in said mounting tube and movable along its axis and about its axis by hand operation within said mounting tube,
    said slide tube forming an optical path and comprising a window in said slide tube near one of its ends which acts as a film gate, a reflecting mirror fixed within said slide tube at an angle to the axis of said slide tube and in image reflecting position relative to said wall window, a magnification lens fixed within said slide tube and an eyepiece lens fixed within said slide tube;
    wherein said slide tube may be moved by hand so that a desired portion of the film may be lighted through said diffuser tube, seen through said wall window and enlarged and viewed.

2. A portable viewing device as in claim 1 and further including a ring-like cylindrical opaque hand grip member fixed to said diffuser tube near one of its ends.

3. A portable viewing device as in claim 1 wherein said wall window is a rectangular opening substantially the same size and shape as the area representing a page on a microfiche film card.

4. A portable viewing device as in claim 1 wherein said mirror is a front face mirror positioned at an angle of substantially 45° to said axis of the slide tube.

5. A portable viewing device as in claim 1 wherein said magnification (objective) lens is a convex-convex lens.

6. A portable viewing device as in claim 1 wherein said eyepiece lens is a convex-convex lens.

7. A portable viewing device as in claim 1 wherein said eyepiece diffuser cylinder, mounting tube and slide tube are right-angle cylindrical hollow tubular members centered on a common axis.

8. A microfiche portable viewing device for reading photographic written matter on microfiche film cards, including
    a cylindrical plastic resin translucent diffuser tube which provides for entry of sufficient light under daylight ambient conditions for viewing the film;
    an opaque cylindrical hand grip tubular member fixed to said diffuser tube near one of its ends;
    a transparent cylindrical mounting tube centered within said diffuser tube to provide a cylindrical gap between said diffuser tube and said mounting tube for the insertion of said film; and
    a hollow slide tube having a central axis and axially centered in said mounting tube and longitudinally and axially movable by hand operation within said mounting tube,
    said slide tube forming an optical path and comprising a rectangular window in said slide tube near one of its ends which acts as a film gate, said window being a rectangular opening substantially the same size and shape as the area representing a page on a microfiche film card,
    a reflecting mirror fixed within said slide tube at a substantially 45° angle to the axis of said slide tube and in image reflecting position relative to said wall opening, a convex-convex magnification (objective) lens fixed within said slide tube and a convex-convex eyepiece lens fixed within said slide tube;
    wherein said slide tube may be moved by hand so that a desired portion of the film may be lighted through said diffuser tube, seen through said wall window and enlarged and read.

* * * * *